(12) United States Patent
Shibaoka (10) Patent No.: US 11,038,238 B2
(45) Date of Patent: Jun. 15, 2021

(54) ALKALINE SECONDARY BATTERY

(71) Applicant: FDK CORPORATION, Tokyo (JP)

(72) Inventor: Hiroyuki Shibaoka, Tokyo (JP)

(73) Assignee: FDK CORPORATION, Tokyo (JP)

( * ) Notice: Subject to any disclaimer, the term of this patent is extended or adjusted under 35 U.S.C. 154(b) by 61 days.

(21) Appl. No.: 16/347,172

(22) PCT Filed: Sep. 26, 2017

(86) PCT No.: PCT/JP2017/034769
§ 371 (c)(1),
(2) Date: May 2, 2019

(87) PCT Pub. No.: WO2018/116567
PCT Pub. Date: Jun. 28, 2018

(65) Prior Publication Data
US 2020/0266404 A1    Aug. 20, 2020

(30) Foreign Application Priority Data

Dec. 21, 2016  (JP) .............................. JP2016-248079

(51) Int. Cl.
*H01M 10/34*   (2006.01)
*H01M 4/24*    (2006.01)
*H01M 50/325*  (2021.01)
*H01M 50/155*  (2021.01)

(52) U.S. Cl.
CPC ......... *H01M 50/325* (2021.01); *H01M 4/242* (2013.01); *H01M 10/345* (2013.01); *H01M 50/155* (2021.01)

(58) Field of Classification Search
CPC .......... H01M 2/12; H01M 10/34; H01M 2/04; H01M 4/24; H01M 10/345; H01M 4/242; H01M 2/0482; H01M 2/1229
See application file for complete search history.

(56) References Cited

FOREIGN PATENT DOCUMENTS

| JP | 03-159057 | 7/1991 |
|----|-----------|--------|
| JP | 09-035695 | 2/1997 |
| JP | 2002-260623 | 9/2002 |

(Continued)

OTHER PUBLICATIONS

JP2003045395A MT (Year: 2003).*

(Continued)

*Primary Examiner* — Alexander Usyatinsky
(74) *Attorney, Agent, or Firm* — Kinney & Lange, P.A.

(57) ABSTRACT

A nickel-metal hydride secondary battery is provided with: an outer package can having an opening at an upper end; an electrode group accommodated in the outer package can together with an alkaline electrolyte; and a sealing body that seals the opening of the outer package can. The sealing body includes a cover plate having a central through hole, and a valve element made of an elastic material to close the central through hole. The valve element includes a cylindrical main body part having a base end surface that covers the central through hole, and an extended diameter part positioned on an opposite side of the main body part from the base end surface and having a diameter made larger than a diameter of the main body part. A ratio R of a thickness T of the extended diameter part to a total height H of the valve element is equal to or higher than 27%.

4 Claims, 3 Drawing Sheets

(56) References Cited

FOREIGN PATENT DOCUMENTS

| | | | |
|---|---|---|---|
| JP | 2003-045393 | | 2/2003 |
| JP | 2003045395 A | | 2/2003 |
| JP | 2003045395 | * | 12/2003 |
| JP | 2005026160 A | | 1/2005 |
| JP | 2005 026160 | * | 2/2005 |
| JP | 2005-347130 | | 12/2005 |
| JP | 2007-24510 | | 9/2007 |
| JP | 20072410 | * | 9/2007 |
| WO | WO 2016/059618 | * | 10/2015 |
| WO | 2016059618 A1 | | 4/2016 |

OTHER PUBLICATIONS

JP 2005 026160 MT (Year: 2005).*
English translation of International Search Report dated Jan. 9, 2019, for corresponding PCT Application No. PCT/JP2017/034769.
Extended European Search Report dated Jun. 17, 2020, received for corresponding European Application No. 17884695.2, 7 pages.

* cited by examiner

ALKALINE SECONDARY BATTERY

CROSS-REFERENCE TO RELATED APPLICATION(S)

This application is the national phase of PCT Application No. PCT/JP2017/034769 filed on Sep. 26, 2017, which in turn claims priority to Japanese Application No. 2016-248079 filed on Dec. 21, 2016, both of which are hereby incorporated by reference in their entireties.

BACKGROUND

Technical Field

The present disclosure relates to an alkaline secondary battery, and more specifically relates to an alkaline secondary battery having a safety valve.

Description of Related Art

As one type of alkaline secondary battery, a sealed nickel-metal hydride secondary battery is known. The sealed nickel-metal hydride secondary battery is formed in such a manner that an electrode group is accommodated together with an alkaline electrolyte in an outer package can having an opening, the electrode group including a positive electrode and a negative electrode which are overlapped with a separator placed therebetween, and the opening of the outer package can is air-tightly closed by a sealing body.

Meanwhile, when the nickel-metal hydride secondary battery is charged while the positive electrode and the negative electrode are mistaken for each other (erroneous charging), or is overcharged, there is a possibility that gas is abnormally generated in the battery to cause an increase in pressure and deformation of the outer package can, leading to explosion of the battery. Therefore, for preventing such explosion of the battery, there have been developed various nickel-metal hydride secondary batteries each having a safety valve that is opened to discharge gas generated in the battery to the outside when the pressure of the gas in the battery exceeds a certain value (e.g., see Patent Document 1).

Such a safety valve is normally provided in a sealing body. The structure of the sealing body having the safety valve is as follows, for example.

The sealing body includes: a cover plate having an air vent and fitted in an opening of the outer package can; a valve element disposed so as to close the air vent; and a cap member accommodating the valve element and also serving as a positive electrode terminal. Note that a gas vent is provided on the side surface of the cap member. The valve element described above is made of an elastic material, such as a rubber-based material, and has a cylindrical shape. The valve element is in the state of being compressed between the top wall of the cap member and the cover plate and closes the opening edge of the air vent until the pressure becomes predetermined pressure, thereby keeping the sealability of the battery.

When gas is abnormally generated in the battery and the pressure of the gas in the battery increases and exceeds the predetermined pressure, the valve element is elastically deformed by the pressure of the gas to open the air vent of the cover plate. Thereby, the gas in the battery is discharged outside via the air vent and the gas vent, to prevent the explosion of the battery. With a decrease in pressure of the gas in the battery, the valve element returns to its original shape and closes the air vent of the cover plate, and the battery comes back into the sealed state.

Meanwhile, when the safety valve operates and the gas is discharged from the inside of the battery, an alkaline electrolyte is also discharged outside with the discharging of the gas. When the alkaline electrolyte is discharged as thus described, the amount of the alkaline electrolyte in the battery decreases. The decrease in the alkaline electrolyte inhibits the charging/discharging reaction of the battery, so that the battery life is exhausted.

When the pressure generated at the time of deformation of the valve element and opening of the air vent is referred to as working pressure of the valve element, in the case of relatively low working pressure of the valve element, the valve element is deformed to open the air vent even if the internal pressure of the battery is relative low pressure. As thus described, when the working pressure of the valve element is low, the air vent is opened even with a small increase in internal pressure, and the alkaline electrolyte of the battery is discharged outside at each time of the opening, thereby causing shortening of the battery life.

For extending the battery life, it is effective to make the working pressure of the valve element as high as possible within a range lower than pressure at which the outer package can of the battery begins to be deformed (hereinafter referred to as explosion pressure) so that the pressure becomes a value close to the explosion pressure. Increasing the working pressure of the valve element in this manner lowers the frequency of the opening of the air vent, whereby it is possible to prevent the alkaline electrolyte from being discharged outside the battery and extend the battery life.

Therefore, attempts have been made to make the working pressure of the valve element as high as possible within the range lower than the explosion pressure so as to extend the battery life. Such attempts include: adjusting combination of rubber materials constituting the valve element to increase the hardness of rubber; and adjusting dimensions in the cap member to more strongly press the valve element accommodated in the cap member and increase the compression ratio of the valve element.

PRIOR ART DOCUMENT

Patent Document

Patent Document 1: Japanese Patent Laid-Open No. 2003-045393

SUMMARY

In the meantime, the working pressure of the valve element as described above, which is obtained in the aspect of increasing hardness of rubber constituting the valve element or in the aspect of increasing the compression ratio of the valve element, has yet to reach a value close to the explosion pressure.

However, the working pressure of the valve element in the current situation, which is reached in the aspect of increasing the hardness of rubber constituting the valve element or the aspect of increasing the compression ratio of the valve element as described above, is getting closer to the limit, and it has become difficult to further increase the working pressure of the valve element by these aspects.

The present disclosure has been made based on the above circumstances, and an object of the present disclosure is to provide an alkaline secondary battery more excellent in life characteristics than in the past by making working pressure of a valve element higher than in the current situation.

In order to achieve the above object, according to the present disclosure, there is provided an alkaline secondary battery including: an outer package can having an opening at an upper end; an electrode group accommodated in the outer package can together with an alkaline electrolyte; and a sealing body that seals the opening of the outer package can, and in the alkaline secondary battery, the sealing body includes a cover plate having an air vent, and a valve element made of an elastic material to close the air vent, the valve element includes a cylindrical main body part having a base end surface that covers the air vent, and an extended diameter part positioned on an opposite side of the main body part from the base end surface and having a diameter made larger than a diameter of the main body part, and a ratio of a thickness of the extended diameter part to a total height of the valve element is equal to or higher than 27%.

Further, the sealing body preferably accommodates the valve element inside and includes a cap member that presses the accommodated valve element to the cover plate.

Moreover, the elastic material is preferably ethylene propylene diene rubber.

The alkaline secondary battery according to the present disclosure is provided with the valve element including the cylindrical main body and the extended diameter part having the diameter made larger than the diameter of the main body part, and the working pressure of the valve element is controlled by adjusting the thickness of the extended diameter part of the valve element. In the alkaline secondary battery according to the present disclosure, the ratio of the thickness of the extended diameter part to the total height of the valve element is equal to or higher than 27%, so that the working pressure of the valve element can be increased to a pressure range which has been not reachable in the conventional aspect. Thus, according to the present disclosure, it is possible to provide an alkaline secondary battery more excellent in life characteristics than in the past.

DETAILED DESCRIPTION

An alkaline secondary battery to which the present disclosure is applied will be described with reference to the drawings, taking as an example a case where the present disclosure is applied to, for example, an AA-size cylindrical nickel-metal hydride secondary battery (hereinafter referred to as battery) 2.

Figure 1:
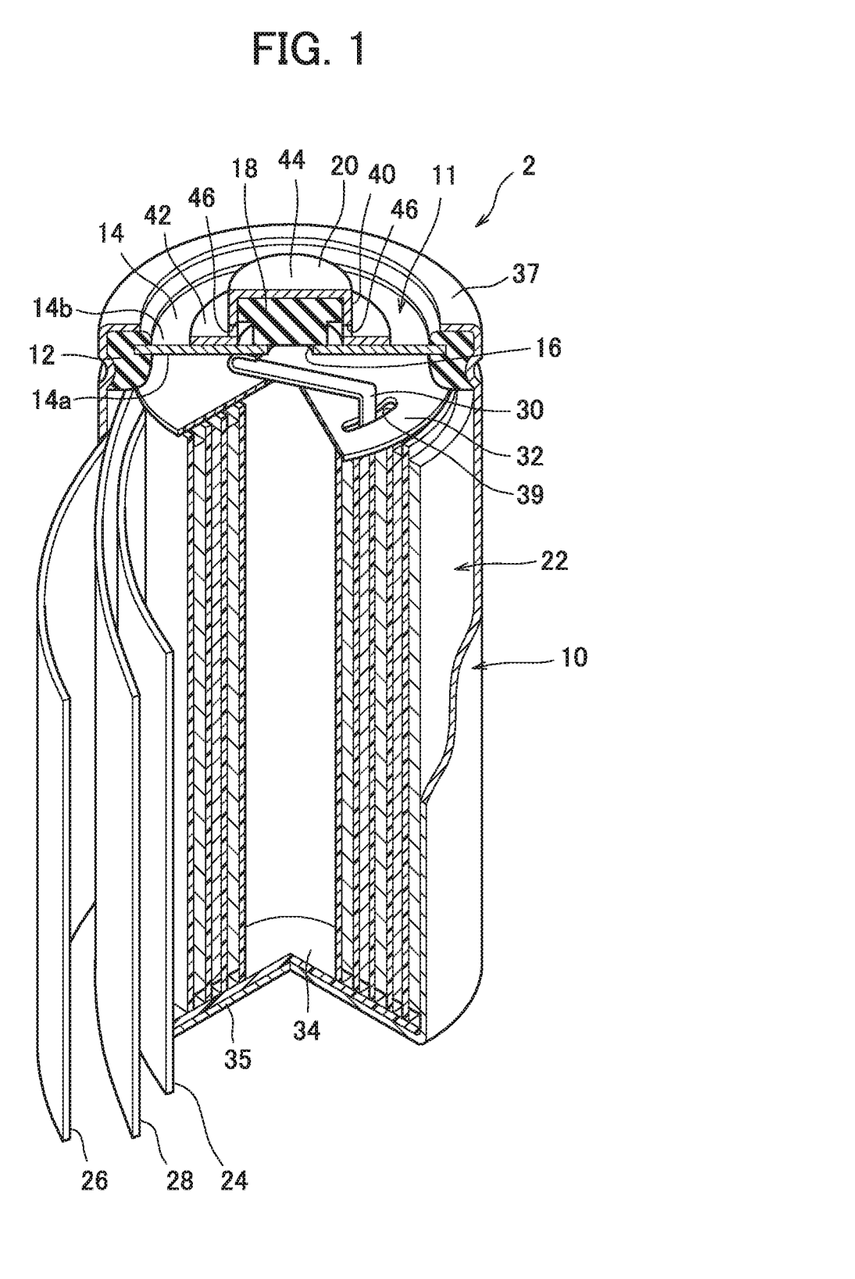
FIG. 1 is a perspective view illustrating a partially sectioned cylindrical nickel-metal hydride secondary battery according to one embodiment of the present disclosure.

As illustrated in FIG. 1, the battery 2 includes an outer package can 10 forming a bottomed cylindrical shape with its upper end opened. The outer package can 10 has conductivity, and its bottom wall 35 functions as a negative electrode terminal. An electrode group 22 is accommodated in the outer package can 10.

The electrode group 22 is formed of a positive electrode 24, a negative electrode 26, and a separator 28 each having a belt shape. Specifically, the electrode group 22 is formed by spirally winding the positive electrode 24 and the negative electrode 26 which are overlapped with the separator 28 placed therebetween. The outermost periphery of the electrode group 22 is formed of a part of (the outermost periphery) of the negative electrode 26, and in contact with the inner peripheral wall of the outer package can 10. That is, the negative electrode 26 and the outer package can 10 are electrically connected to each other.

Further, a predetermined amount of an alkaline electrolyte (not illustrated) has been poured into the outer package can 10. The alkaline electrolyte promotes charging/discharging reaction between the positive electrode 24 and the negative electrode 26. As the alkaline electrolyte, one used for a general nickel-metal hydride secondary battery is used. For example, a sodium hydroxide aqueous solution is preferably used.

As a material of the separator 28, one used for the general nickel-metal hydride secondary battery is used. For example, a nonwoven cloth made of polyolefin fiber such as polyethylene or polypropylene is preferably used.

The positive electrode 24 is made up of a conductive positive electrode base material forming a porous structure and having a large number of pores, and a positive electrode mixture held in the pores and on the surface of the conductive positive electrode base material.

As such a positive electrode base material, for example, nickel foam can be used.

The positive electrode mixture includes positive-electrode active material particles, a conductive material, a positive electrode additive, and a binding agent. The binding agent acts to bind the positive-electrode active material particles, the conductive material, and the positive electrode additive together, and simultaneously bind the positive electrode mixture to the positive electrode base material. As the binding agent, for example, carboxymethyl cellulose or the like can be used here.

The positive-electrode active material particles are nickel hydroxide particles or high-order nickel hydroxide particles.

As the conductive material, for example, it is possible to use one, or two or more, selected from cobalt (Co) and cobalt compounds such as a cobalt oxide (CoO) and cobalt hydroxide ($Co(OH)_2$).

As the positive electrode additive, one appropriately selected as needed is added so as to improve characteristics of the positive electrode. Examples of the main positive electrode additive include yttrium oxide and zinc oxide.

The positive electrode 24 can be manufactured in such a manner as follows, for example.

First, a positive electrode mixture slurry including positive-electrode active material powder made of positive-electrode active material particles, a conductive material, a positive electrode additive, water, and a binding agent is prepared. The obtained positive electrode mixture slurry is allowed to fill nickel foam, for example, and then dried. After the drying, the nickel foam filled with nickel hydroxide particles or the like is rolled and then cut. This leads to production of the positive electrode 24 holding the positive electrode mixture.

Next, the negative electrode 26 will be described.

The negative electrode 26 has a conductive negative electrode core body forming a belt shape, and a negative electrode mixture is held in the negative electrode core body.

The negative electrode core body is made of a sheet-like metal material in which through holes are distributed, and for example, a punching metal sheet can be used. The negative electrode mixture is not only allowed to fill the inside of the through holes in the negative electrode core body, but also held in a layered form on each surface of the negative electrode core body.

The negative electrode mixture includes hydrogen absorbing alloy particles, a negative electrode additive, a conductive material, and a binding agent. The hydrogen absorbing alloy here is an alloy capable of adsorbing and discharging hydrogen that is a negative-electrode active material. The type of hydrogen absorbing alloy is not particularly limited, but a rare earth-Mg—Ni based hydrogen absorbing alloy, including a rare earth element, Mg, and Ni, is used as a preferable one. The binding agent described above acts to bind the hydrogen absorbing alloy particles, the negative electrode additive, and the conductive material together, and simultaneously bind the negative electrode mixture to the negative electrode core body. A hydrophilic or hydrophobic polymer can be used here as the binding agent, and carbon black, graphite, nickel powder, or the like can be used as the conductive material.

As the negative electrode additive, one appropriately selected as needed is added so as to improve characteristics of the negative electrode.

The negative electrode 26 can be manufactured in such a manner as follows, for example.

First, hydrogen absorbing alloy powder, the conductive material, the binding agent, and water are prepared and kneaded to give a negative electrode mixture slurry. Note that the negative electrode additive may further be added as necessary. The obtained negative electrode mixture slurry is applied to the negative electrode core body and dried. After the drying, the negative electrode core body, to which the hydrogen absorbing alloy particles and the like adhere, is rolled to increase the filling density of the hydrogen absorbing alloy, and the negative electrode core body is then cut into a predetermined shape to produce the negative electrode 26.

The positive electrode 24 and the negative electrode 26 produced as described above are spirally wound with the separator 28 placed therebetween to form the electrode group 22.

A sealing body 11 is fixed to an opening of the outer package can 10 accommodating the electrode group 22 as described above and the alkaline electrolyte. The sealing body 11 includes a cover plate 14, a valve element 18, and a cap member 20.

The cover plate 14 is a disk-shaped member having conductivity and has a first surface 14a positioned inside the battery 2, and a second surface 14b positioned outside the battery 2 which is on the opposite side from the first surface 14a. A central through hole 16 as an air vent is provided in the center of the cover plate 14. The central through hole 16 is normally closed by the valve element 18 described later. The cover plate 14 and ring-shaped insulating packing 12 surrounding the cover plate 14 are disposed in the opening of the outer package can 10, and the cover plate 14 and the insulating packing 12 are fixed to an opening edge 37 of the outer package can 10 by caulking of the opening edge 37 of the outer package can 10.

In the outer package can 10, as apparent from FIG. 1, a positive electrode lead 30 is disposed between the electrode group 22 and the cover plate 14. The positive electrode lead 30 has one end connected to the positive electrode 24 and the other end connected to the first surface 14a of the cover plate 14. Hence the positive electrode 24 and the cover plate 14 are connected electrically. Note that a circular upper insulating member 32 is disposed between the cover plate 14 and the electrode group 22, and the positive electrode lead 30 extends through a slit 39 provided in the upper insulating member 32. Further, a circular lower insulating member 34 is disposed between the electrode group 22 and the bottom of the outer package can 10.

On the other hand, the second surface 14b of the cover plate 14 is electrically connected with the cap member 20 made of a metal material which also serving as a positive electrode terminal, whereby the positive electrode 24 and the positive electrode terminal (cap member 20) are electrically connected to each other via the positive electrode lead 30 and the cover plate 14.

Figure 2:
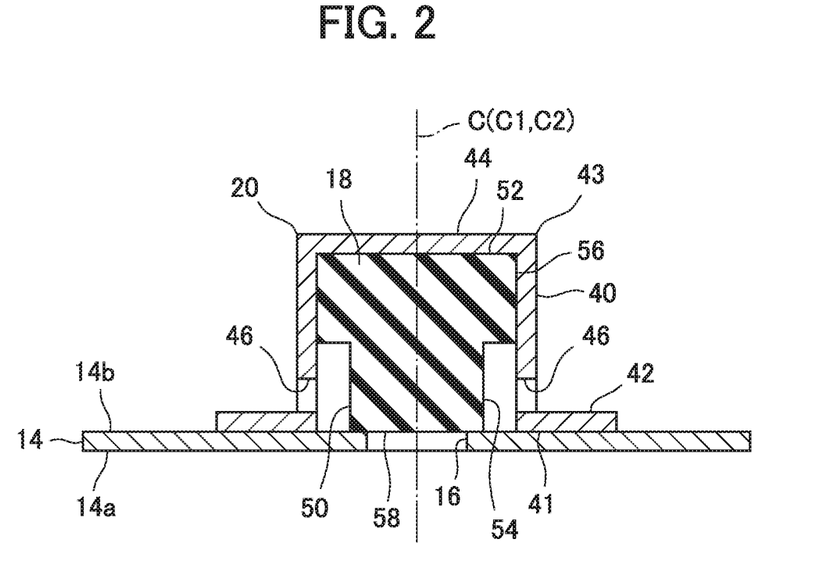
FIG. 2 is a sectional view illustrating an enlarged sealing body according to one embodiment of the present disclosure.

As illustrated in FIG. 2, the cap member 20 includes a cylindrical body part 40, a flange 42 provided at the peripheral edge of a base end 41 of the body part 40, and a top wall 44 provided so as to close a tip 43 on the opposite side from the base end 41. Further, as apparent from FIG. 2, a laterally opened gas vent 46 is provided in the lower portion of the body part 40. The cap member 20 is provided so as to cover the valve element 18, and the portion of the flange 42 is welded to the second surface 14b of the cover plate 14. The inner diameter of the body part 40 of the cap member 20 is larger than the diameter of the central through hole 16 of the cover plate 14.

The valve element 18 is made of an elastic material such as a rubber-based material, and closes the central through hole 16 of the cover plate 14. The valve element 18 is accommodated in the cap member 20 in the sealing body 11, and the cover plate 14 side is taken as a base end 50 while the opposite side from the base end 50 is taken as a head 52. The valve element 18 includes a cylindrical main body part 54 positioned on the base end 50 side, and an extended diameter part 56 positioned on the head 52 side and having a diameter made larger than the diameter of the main body part 54. A central axis line C1 of the main body part 54 and a central axis line C2 of the extended diameter part 56 match each other. That is, the main body part 54 and the extended diameter part 56 are on the same axis. For this reason, the valve element 18 forms a stepped cylindrical shape as a whole, and has a vertical cross section illustrated in FIG. 3. A height along a central axis line C in the valve element 18 is taken as a total height H of the valve element 18, and a length along the central axis line C in the extended diameter part 56 is taken as a thickness T of the extended diameter part 56. Further, the diameter of the main body part 54 is set to be a larger value than the diameter of the central through hole 16 so that the main body part 54 covers the central through hole 16. The diameter of the extended diameter part 56 is set to be larger than the diameter of the main body part 54 and substantially the same value as the inner diameter of the cap member 20. The diameters of the main body part 54 and the extended diameter part 56 are set in accordance with the size of the battery, specifically the sizes of the cap member 20 and central through hole 16 of the cover plate 14.

The valve element 18 is made of a rubber-based material and can thus be elastically deformed, and as illustrated in FIG. 2, the valve element 18 is accommodated inside the cap member 20 while compressed to some degree. As a result, the head 52 abuts on the inner surface of the top wall 44 of the cap member 20, and the valve element 18 as a whole is pressed toward the cover plate 14. Then, the base end surface 58 of the main body part 54 in the valve element 18 covers and air-tightly closes the central through hole 16. That is, the valve element 18 closes the central through hole 16 with predetermined pressure. In other words, the valve element 18 causes action of predetermined working pressure. Thus, if gas is abnormally generated in the outer package can 10 due to overcharging or the like of the battery 2 and the pressure of the gas in the battery 2 increases and exceeds the predetermined working pressure described above, the valve element 18 is pressed and deformed and the central through hole 16 is opened. As a result, the gas is discharged from the outer package can 10 to the outside via the central through hole 16 and the gas vent 46 of the cap member (positive electrode terminal) 20. When the pressure of the gas in the battery 2 decreases due to the discharging of the gas, the valve element 18 returns to its original shape to seal the battery 2 again.

In the present disclosure, at the time of accommodating the valve element 18 inside the cap member 20, a compression ratio for compression of the valve element 18 is preferably set to 25% or higher and 30% or lower. When the compression ratio is lower than 25%, the force to press the valve element 18 to the cover plate 14 is weakened, thereby making it difficult to obtain the minimum working pressure. On the contrary, when the compression ratio is excessively high, for example, when the compression ratio exceeds 30%, the working pressure increases, but the work to weld the cap member 20 to the cover plate 14 becomes difficult and a welding defect might occur. In addition, when the compression ratio exceeds 30%, the valve element 18 is more unlikely to be deformed elastically, and variation in working pressure of the valve element 18 increases. As a result, the valve element does not operate with desired pressure, which might cause a problem of significant increase in internal pressure of the battery, and the safety of the battery deteriorates. It is thus preferable to set the compression ratio of the valve element to the above range.

Meanwhile, the working pressure obtained by increasing the compression ratio of the valve element 18 to 30% or higher is normally about 3.0 MPa. In this case, when the internal pressure of the battery reaches 3.0 MPa, the valve element 18 is deformed to open the central through hole 16 and discharge the gas. However, it is not until the internal pressure of the battery exceeds 5.0 MPa that the outer package can 10 of the battery starts to be deformed. That is, explosion pressure in a general battery is pressure exceeding 5.0 MPa. Thus, when the internal pressure of the battery is 5.0 MPa or lower, the outer package can 10 is not deformed and the battery is not exploded, so that the safety of the battery is ensured. Hence the valve element 18 may only operate before the internal pressure of the battery exceeds 5.0 MPa, and the working pressure of the valve element 18 is desirably increased to 5.0 MPa. That is, in the battery, the internal pressure is permitted up to 5.0 MPa, and hence this pressure is referred to as permissible pressure. As thus described, when the working pressure of the valve element exceeds 3.0 MPa and is increased to 5.0 MPa, unnecessary opening of the valve element can be reduced to prevent discharging of the alkaline electrolyte more than in the past, thereby extending the battery life.

Therefore, the present inventor conducted earnest study on increasing the working pressure of the valve element without greatly increasing the compression ratio of the valve element. In the process of the study, the present inventor focused attention on the ratio between the total height H of the valve element and the thickness T of the extended diameter part, and found that by adjusting the ratio, the working pressure of the valve element can be increased more than in the past without greatly increasing the compression ratio of the valve element.

That is, in the present disclosure, the ratio R of the thickness T of the extended diameter part in the valve element to the total height H of the valve element is set to 27% or higher. That is, the ratio R obtained by Formula (I) below is set so as to satisfy the relation of 27% R.

$$R[\%] = (T/H) \times 100 \tag{I}$$

When the ratio R is 27% or higher, the working pressure of the valve element exceeds 3.0 MPa.

Note that the upper limit of the ratio R is preferably set to 47% at which the working pressure of the valve element is 5 MPa or lower.

A more preferable range of the ratio R is 36% ≤ R ≤ 47%.

The rubber-based material constituting the valve element 18 is not particularly limited as long as being a material used for a general nickel-metal hydride secondary battery, and examples of the rubber-based material include chloroprene rubber and ethylene propylene diene rubber. The ethylene propylene diene rubber here is excellent in alkali resistance and is excellent in heat resistance and cold tolerance as compared to the chloroprene rubber, so that it is preferable to use the ethylene propylene diene rubber as the rubber-based material constituting the valve element 18. In the nickel-metal hydride secondary battery, the future expansion of the usable temperature region has been desired, and hence the use of the ethylene propylene diene rubber is advantageous in development of a battery usable in a high-temperature environment and a low-temperature environment. Note that ethylene propylene diene rubber with a hardness (JIS-A) of 30 to 90 degrees is preferably used.

As described above, according to the present disclosure, by adjusting the ratio R of the thickness T of the extended diameter part in the valve element 18 to the total height H of the valve element 18, it is possible to increase the working pressure of the valve element up to the permissible pressure of the battery internal pressure without increasing the compression ratio of the valve element 18 as in the past. Hence the sealability of the battery is improved and the alkaline electrolyte can be prevented from being discharged, thereby extending the battery life. Further, even when increasing the working pressure of the valve element is unnecessary, according to the present disclosure, the effect of improving the formability is obtained by decreasing the hardness of the rubber material of the valve element. Moreover, according to the present disclosure, the working pressure can be increased even when the compression ratio of the valve element is decreased, and it is thus possible to improve the safety of the battery as compared to the conventional battery in which the working pressure is increased by increasing the compression ratio. That is, according to the present disclosure, it is possible to provide an alkaline secondary battery being safer and having a longer life.

EXAMPLES

1. Manufacturing of Battery

Example 1

(1) Manufacturing of Sealing Body

Figure 3:
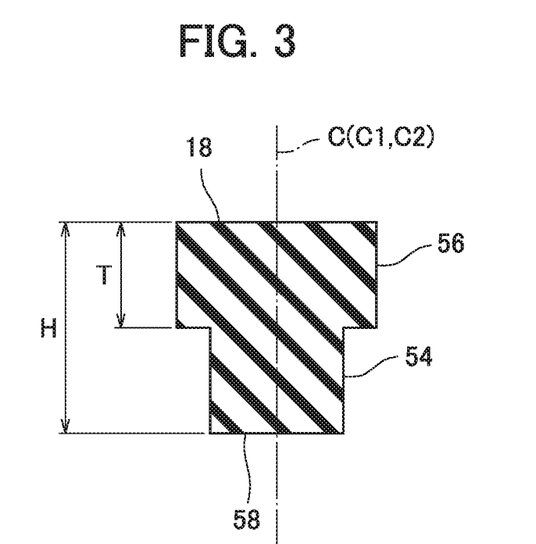
FIG. 3 is a sectional view illustrating a valve element according to one embodiment of the present disclosure.

Ethylene propylene diene rubber with a hardness (JIS-A) of 84 degree was prepared. This ethylene propylene diene rubber was formed into a stepped cylindrical shape as illustrated in FIG. 3 to manufacture the valve element 18. At this time, the total height H of the valve element 18 was set to 3.5 mm, the thickness T of the extended diameter part 56 was set to 0.95 mm, the outer diameter of the extended diameter part 56 was set to 4.5 mm, and the outer diameter of the main body part 54 in the valve element 18 was set to 2.64 mm. The ratio R of the thickness T of the extended diameter part 56 to the total height H of the valve element 18 is 27%.

The obtained valve element 18 was accommodated inside the cap member 20, and the cap member 20 was welded onto the second surface 14b of the cover plate 14. At this time, the valve element 18 was provided in a position to close the central through hole 16 of the cover plate 14. The diameter of the central through hole 16 was set to 1.8 mm. In addition, dimensions of each part of the cap member 20 were set to predetermined dimensions with which the valve element 18 can be accommodated at a compression ratio of 27%. In this manner, the sealing body 11 was manufactured. A total of 25 sealing bodies 11 were manufactured, which were 20 sealing bodies 11 for measurement of the working pressure of the valve element, and five sealing bodies 11 for assembly into the battery, to be assembled into the battery.

(2) Assembly of AA-Size Cylindrical Nickel-Metal Hydride Secondary Battery

Next, the electrode group 22 was produced by spirally winding the positive electrode 24 and the negative electrode 26, which were for use in the general AA-size nickel-metal hydride secondary battery, in a state where the separator 28 formed of a nonwoven cloth made of polypropylene fiber was placed between the positive electrode 24 and the negative electrode 26.

The obtained electrode group 22 was accommodated into the bottomed cylindrical outer package can 10 for AA size along with an alkaline electrolyte made of sodium hydroxide aqueous solution.

Subsequently, the sealing body 11 for assembly into the battery and the positive electrode 24 were electrically connected by the positive electrode lead 30, and the sealing body 11 was caulked to the opening at the upper end of the outer package can 10 via the insulating packing 12. In this manner, the AA size battery 2 was manufactured. Note that the rated capacity of the manufactured battery 2 is 2300 mAh.

(3) Initial Activation Treatment

The charging/discharging operation, in which the obtained battery 2 was charged at a current of 0.1 C in an environment at a temperature of 25° C. for 16 hours, and then discharged at a current of 0.2 C until a battery voltage became 0.5 V, was repeated twice to perform initial activation treatment. In this manner, the battery 2 was brought into a usable state.

Example 2

Sealing bodies for measurement of the working pressure and sealing bodies for assembly into the battery in Example 2 were manufactured individually in the same manner as in the sealing bodies 11 of Example 1 except that the thickness T of the extended diameter part in the valve element was set to 1.25 mm and the ratio R of the thickness T of the extended diameter part to the total height H of the valve element was set to 36%.

By using the obtained sealing body for assembly into the battery, a nickel-metal hydride secondary battery in a usable state was manufactured in the same manner as in Example 1.

Example 3

Sealing bodies for measurement of the working pressure and sealing bodies for assembly into the battery in Example 3 were manufactured individually in the same manner as in the sealing bodies 11 of Example 1 except that the thickness T of the extended diameter part in the valve element was set to 1.50 mm and the ratio R of the thickness T of the extended diameter part to the total height H of the valve element was set to 43%.

By using the obtained sealing body for assembly into the battery, a nickel-metal hydride secondary battery in a usable state was manufactured in the same manner as in Example 1.

Comparative Example 1

Sealing bodies for measurement of the working pressure and sealing bodies for assembly into the battery in Comparative Example 1 were manufactured individually in the same manner as in the sealing bodies 11 of Example 1 except that the thickness T of the extended diameter part in the valve element was set to 0.75 mm and the ratio R of the thickness T of the extended diameter part to the total height H of the valve element was set to 21%.

By using the obtained sealing body for assembly into the battery, a nickel-metal hydride secondary battery in a usable state was manufactured in the same manner as in Example 1.

2. Evaluation (1) Measurement of Working Pressure of Valve Element

A working pressure measurement device including a cylinder and a gas supply unit capable of supplying gas (air) while applying pressure into the cylinder with the gas was prepared, the cylinder having the same shape as that of the outer package can for AA size and being mountable with the sealing body for measurement of the working pressure.

The sealing body for measurement of the working pressure was mounted into the cylinder in the working pressure measuring device described above. Subsequently, the cylinder mounted with the sealing body was placed in an environment at 25° C., and in this state, the air pressure in the cylinder was increased. Then, the pressure at the time when the valve element was opened and the air was discharged outside was measured as the working pressure. Table 1 shows the obtained result as the working pressure. In addition, the relation between the working pressure of the valve element and the ratio R of the thickness T of the extended diameter part to the total height H of the valve element was illustrated in FIG. 4 as a graph.

(2) Measurement of Amount of Alkaline Electrolyte Discharged

The mass of each of the batteries of Examples 1 to 3 and Comparative Example 1 subjected to the initial activation treatment were measured. This mass was taken as a mass before charging.

Next, in an environment of 40° C., a charging current of 1.0 C was allowed to flow in each battery and charging was performed by so-called—ΔV control in which charging is performed until the battery voltage decreased 10 mV after reaching the maximum. Then, the battery after the charging was left in the same environment for 10 minutes so as to be rested. The charging in the −ΔV control and the rest were taken as one cycle, and this cycle was repeated six times. The battery was thereby brought into an overcharged state.

The mass of the battery brought into the overcharged state was measured. This mass was taken as a mass after overcharging.

Next, the difference in mass between the batteries before and after overcharging was obtained by Formula (II) below. Table 1 shows the obtained result as a mass decreased during overcharging. The mass decreased during overcharging corresponds to an amount of the alkaline electrolyte discharged outside when gas is generated inside the battery due to overcharging and the safety valve operates with an increase in internal pressure of the battery. The larger the mass decreased during overcharging, the larger the amount of the alkaline electrolyte discharged, and it is considered that the battery life is shortened corresponding to the amount of the alkaline electrolyte discharged.

mass decreased during overcharging=mass before charging−mass after overcharging    (II)

TABLE 1

| | Total height H of valve element [mm] | Thickness T of extended diameter part [mm] | Ratio R of thickness T to total height H [%] | Working pressure of valve element [MPa] | Mass decreased during overcharging [g] |
|---|---|---|---|---|---|
| Example 1 | 3.5 | 0.95 | 27 | 3.2 | 0.01 |
| Example 2 | 3.5 | 1.25 | 36 | 4.0 | 0 |
| Example 3 | 3.5 | 1.50 | 43 | 4.7 | 0 |
| Comparative Example 1 | 3.5 | 0.75 | 21 | 2.6 | 0.05 |

(3) Consideration

In table 1, the working pressure of the valve element of Comparative Example 1 is 2.6 MPa, which is lower than 3.0 MPa being the maximum working pressure reachable in the conventional valve element. That is, the valve element and the battery of Comparative Example 1 are a valve element and a battery having performance equivalent to the conventional products. In Comparative Example 1, the mass decreased during overcharging is 0.05 g, and it is considered that this amount of alkaline electrolyte has been discharged outside the battery. That is, it can be said that in the conventional battery in which the working pressure of the valve element was 3.0 MPa or lower, 0.05 g of the alkaline electrolyte has been discharged by overcharging.

On the other hand, the mass decreased during overcharging of the battery of Example 1 is 0.01 g, and the amount of the alkaline electrolyte discharged has been held lower than that in Comparative Example 1. In addition, the mass decreased during overcharging of each of the batteries of Examples 2 and 3 is 0 g, and the alkaline electrolyte has not been discharged outside. As thus described, in each of the batteries of Examples 1 to 3, the amount of the alkaline electrolyte discharged is small or the alkaline electrolyte is not discharged, so that it is possible to obtain the effect of effectively preventing a decrease in battery life due to depletion of the alkaline electrolyte.

Such an effect is obtained because the working pressure of the valve element has been increased to 3.0 MPa or higher. In other words, the above effect is obtained because, in each of Examples, even when gas is generated inside the battery due to overcharging and the internal pressure of the battery rises, sufficiently high working pressure has been ensured within the range not reaching the explosion pressure with which the outer package can of the battery would be deformed, and hence frequent opening of the safety valve has been prevented. It is thus considered that in each of Examples, a situation can be avoided where the safety valve is opened even when the safety valve does not originally need to be opened, and useless opening of the valve can be reduced or eliminated.

According to the present disclosure, by adjusting the ratio of the thickness of the extended diameter part to the total height of the valve element, it is possible to easily reduce or eliminate the useless opening of the valve as described above. This enables extension of the life of the obtained battery.

From the results of Table 1, it is found that for obtaining the working pressure exceeding 3.0 MPa, it is necessary to set the ratio R of the thickness T of the extended diameter part to the total height H of the valve element to 27% or higher.

Figure 4:
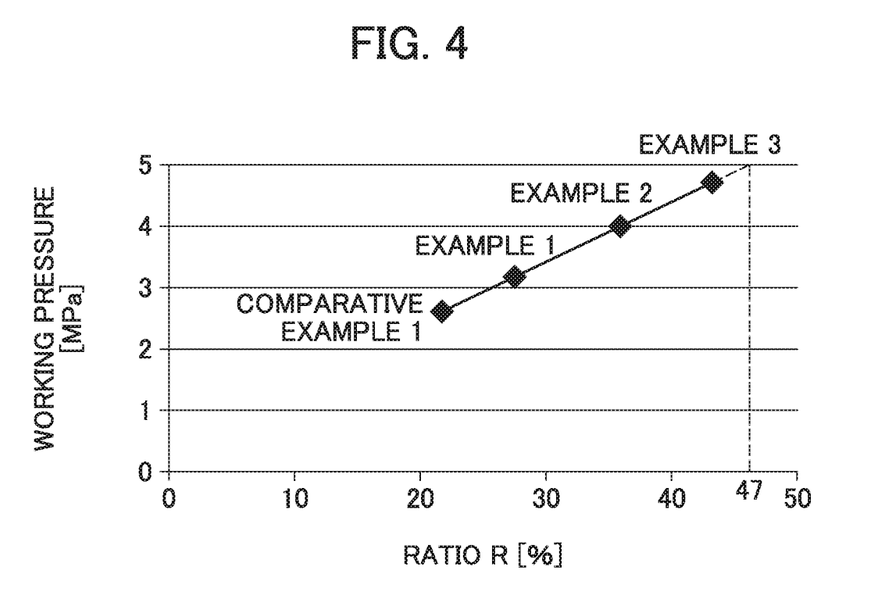
FIG. 4 is a graph illustrating the relation between working pressure of the valve element and a ratio R of a thickness T of an extended diameter part to a total height H of the valve element.

Further, from FIG. 4 illustrating the relation between the working pressure of the valve element and the ratio R of the thickness T of the extended diameter part to the total height H of the valve element, it is found that the working pressure of the valve element and the ratio R are almost proportional. It is found from this relation that the ratio R, at which 5.0 MPa being the permissible pressure of the battery can be obtained, is 47% as indicated by an imaginary line in FIG. 4. It can thus be said that the upper limit of the ratio R of the thickness T of the extended diameter part to the total height H of the valve element is preferably set to 47%.

Further, it is found from Table 1 that in order to set the mass decreased during overcharging to 0 g, namely, in order to prevent the alkaline electrolyte from being discharged, the working pressure of 4 MPa or higher is preferably obtained. It is then found that for obtaining the working pressure of 4 MPa or higher as thus described, the ratio R of the thickness T of the extended diameter part to the total height H of the valve element is preferably set to 36% or higher.

It is clear from above that according to the present disclosure, the life characteristics of the alkaline secondary battery can be improved while the safety of the battery is maintained.

Note that the present disclosure is not limited to the embodiment and Examples described above, but various modifications are possible, and for example, the type of battery is not limited to the nickel-metal hydride secondary battery, but may be a nickel-cadmium secondary battery, a lithium-ion secondary battery, or other battery. In addition, the shape of the battery is not limited to the cylindrical shape, but the battery may be a square battery.

EXPLANATION OF REFERENCE SIGNS

2 Nickel-metal hydride secondary battery
10 Outer package can
12 Insulating packing
11 Sealing body
14 Cover plate
18 Valve element
20 Cap member (positive electrode terminal)
24 Positive electrode
26 Negative electrode
28 Separator
46 Gas vent
52 Head
54 Main body part
56 Extended diameter part
58 Base end surface
H Total height of valve element
T Thickness of extended diameter part

The invention claimed is:

1. An alkaline secondary battery comprising:
an outer package can having an opening at an upper end;
an electrode group accommodated in the outer package can together with an alkaline electrolyte; and
a sealing body that seals the opening of the outer package can, wherein
- the sealing body includes a cover plate having an air vent, and a valve element made of an elastic material to close the air vent,
- the valve element includes a cylindrical main body part having a base end surface that covers the air vent, and an extended diameter part positioned on an opposite side of the main body part from the base end surface and having a diameter larger than a diameter of the main body part, and
- a ratio of a thickness of the extended diameter part to a total height of the valve element is equal to or higher than 27% and equal to or lower than 47%.

2. The alkaline secondary battery according to claim 1, wherein the sealing body accommodates the valve element inside and includes a cap member that presses the accommodated valve element to the cover plate.

3. The alkaline secondary battery according to claim 1, wherein the elastic material is ethylene propylene diene rubber.

4. The alkaline secondary battery according to claim 2, wherein the elastic material is ethylene propylene diene rubber.

\* \* \* \* \*